(12) United States Patent
Su et al.

(10) Patent No.: US 9,837,013 B2
(45) Date of Patent: Dec. 5, 2017

(54) METHODS AND SYSTEMS FOR DISPLAY CORRECTION

(75) Inventors: Yeping Su, Vancouver, WA (US); Xiao-Fan Feng, Vancouver, WA (US); Hao Pan, Camas, WA (US); Yasuo Ozawa, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1754 days.

(21) Appl. No.: 12/170,427

(22) Filed: Jul. 9, 2008

(65) Prior Publication Data

US 2010/0008591 A1    Jan. 14, 2010

(51) Int. Cl.
G06K 9/36 (2006.01)
G09G 3/20 (2006.01)
H04N 17/00 (2006.01)

(52) U.S. Cl.
CPC .......... *G09G 3/2092* (2013.01); *H04N 17/00* (2013.01); *G09G 2320/0233* (2013.01); *G09G 2320/0285* (2013.01); *G09G 2320/0693* (2013.01)

(58) Field of Classification Search
None
See application file for complete search history.

(56) References Cited

U.S. PATENT DOCUMENTS 4,805,127 A * 2/1989 Hata et al. .................... 345/441
4,835,607 A * 5/1989 Keith .......................... 348/390.1

(Continued)

FOREIGN PATENT DOCUMENTS

CN    101127191 A    2/2008
EP    1650730 A1    4/2006

(Continued)

OTHER PUBLICATIONS

Aujol, J.-F., et al., "Structure-texture image decomposition—modeling, algorithms, and parameter selection," International Journal of Computer Vision, 2006.*

(Continued)

*Primary Examiner* — Xuemei Chen
(74) *Attorney, Agent, or Firm* — Kristine Elizabeth Matthews; David C. Ripma

(57) ABSTRACT

Aspects of the present invention are related to systems and methods for compressing display non-uniformity correction data and for using compressed display non-uniformity correction data. A correction image may be compressed by fitting a data model to the correction image data and encoding the model parameter values. A correction image may be decomposed into two images: an image containing the vertically and horizontally aligned structures of the correction image and a smoothly varying image. The smoothly varying image may be compressed by fitting a data model to the smoothly varying image data. Multiple correction images may be compressed by determining eigenvectors which describe the distribution of the multiple correction images. Projection coefficients may be determined by projecting each correction image the determined eigenvectors, and an eigen-image associated with an eigenvector may be compressed. Correction data for a display may be reconstructed from parameter values stored on a display system. A plurality of correction images may be reconstructed from encoded eigen-images stored on a display system.

32 Claims, 4 Drawing Sheets

(56) References Cited

U.S. PATENT DOCUMENTS

| | | | |
|---|---|---|---|
| 5,164,992 A * | 11/1992 | Turk et al. | 382/118 |
| 5,422,675 A * | 6/1995 | Lim | 375/240.24 |
| 5,497,236 A * | 3/1996 | Wolff et al. | 358/296 |
| 5,577,131 A * | 11/1996 | Oddou | 382/173 |
| 5,835,099 A | 11/1998 | Marimont | 345/591 |
| 5,978,511 A * | 11/1999 | Horiuchi et al. | 382/241 |
| 5,995,668 A * | 11/1999 | Corset et al. | 382/233 |
| 6,044,168 A * | 3/2000 | Tuceryan et al. | 382/118 |
| 6,173,084 B1 * | 1/2001 | Aach et al. | 382/260 |
| 6,282,440 B1 * | 8/2001 | Brodnick et al. | 600/512 |
| 6,963,670 B2 * | 11/2005 | Avinash et al. | 382/260 |
| 7,088,863 B2 * | 8/2006 | Averbuch et al. | 382/209 |
| 7,103,229 B2 * | 9/2006 | Porikli | 382/275 |
| 7,609,293 B2 | 10/2009 | Faulkner et al. | 348/208.6 |
| 7,639,940 B2 * | 12/2009 | Yoda et al. | 396/155 |
| 7,668,342 B2 * | 2/2010 | Everett et al. | 382/106 |
| 7,869,649 B2 * | 1/2011 | Watanabe et al. | 382/162 |
| 2001/0015835 A1 | 8/2001 | Aoki | |
| 2005/0007392 A1 | 1/2005 | Kasai et al. | |
| 2005/0168460 A1 * | 8/2005 | Razdan et al. | 345/419 |
| 2005/0238244 A1 * | 10/2005 | Uzawa | 382/242 |
| 2006/0092329 A1 | 5/2006 | Noji | |
| 2007/0071336 A1 * | 3/2007 | Pace | 382/239 |
| 2007/0074251 A1 * | 3/2007 | Oguz et al. | 725/45 |
| 2007/0098271 A1 * | 5/2007 | Kamata | 382/232 |
| 2007/0109245 A1 | 5/2007 | Hwang | |
| 2007/0126758 A1 | 6/2007 | Hwang | |
| 2007/0126975 A1 | 6/2007 | Choi et al. | |
| 2007/0229480 A1 | 10/2007 | Ookawara | |
| 2007/0248272 A1 * | 10/2007 | Sun et al. | 382/239 |
| 2007/0262985 A1 * | 11/2007 | Watanabe et al. | 345/420 |
| 2007/0273701 A1 | 11/2007 | Mizukoshi et al. | |
| 2008/0063292 A1 * | 3/2008 | Nose et al. | 382/243 |
| 2008/0298691 A1 * | 12/2008 | Zhang et al. | 382/228 |
| 2009/0030676 A1 * | 1/2009 | Xu et al. | 704/203 |
| 2009/0096729 A1 * | 4/2009 | Ozawa et al. | 345/87 |
| 2009/0154778 A1 * | 6/2009 | Lei et al. | 382/112 |
| 2009/0268810 A1 * | 10/2009 | Dai | 375/240.12 |
| 2009/0299961 A1 * | 12/2009 | Lo | 707/3 |
| 2010/0092028 A1 * | 4/2010 | Huang et al. | 382/100 |
| 2010/0142786 A1 * | 6/2010 | Degani et al. | 382/131 |

FOREIGN PATENT DOCUMENTS

| | | |
|---|---|---|
| JP | 62-131233 | 6/1987 |
| WO | 2007/097118 A2 | 8/2007 |

OTHER PUBLICATIONS

International Application No. PCT/JP2009/062851—International Search Report and Written Opinion—Mailing Date Oct. 20, 2009.
Chinese Office Action—Application No. 200980126620.7—Dated Jun. 28, 2012.

* cited by examiner

METHODS AND SYSTEMS FOR DISPLAY CORRECTION

CROSS-REFERENCE TO RELATED APPLICATIONS

This application is related to U.S. patent application Ser. No. 11/731,094, entitled "Reduction of mura effects," filed on Mar. 29, 2007 and U.S. patent application Ser. No. 12/008,470, entitled "Correction of visible mura distortions in displays by use of flexible system for memory resources and mura characteristics," filed on Jan. 11, 2008, and the above-listed U.S. Patent Applications are hereby incorporated herein by reference in their entirety.

FIELD OF THE INVENTION

Embodiments of the present invention comprise methods and systems for display correction, in particular, for compression of display non-uniformity correction data and use of compressed display non-uniformity correction data.

BACKGROUND

Inspection and testing of flat panel displays using a human operator may be costly, time consuming and based on the operator's perception. Therefore, the quality of human-operator-based inspections may be dependent on the individual operator and may yield subjective results that may be prone to error. Some automated inspection techniques may rely on a pixel-by-pixel measurement and correction of display non-uniformity. These techniques may require a prohibitive amount of memory for storage of the correction data, and methods and systems for reducing the storage requirements for the correction data may be desirable.

SUMMARY

Some embodiments of the present invention comprise methods and systems for compressing display non-uniformity correction data, in particular, correction images.

In some embodiments of the present invention, a correction image may be compressed by fitting a data model to the correction image and encoding the model parameter values. In some embodiments of the present invention, a piecewise polynomial model may be used. In alternative embodiments of the present invention a B-spline may be used. In some embodiments of the present invention, the correction image may be decomposed into two images: an image containing the vertically and horizontally aligned structures of the correction image and a smoothly varying image. The smoothly varying image may be compressed by fitting a data model to the smoothly varying image.

In some embodiments of the present invention, multiple correction images may be compressed by determining eigenvectors which describe the distribution of the multiple correction images. Projection coefficients may be determined by projecting each correction image on the determined eigenvectors. In some embodiments of the present invention, an eigen-images associated with an eigenvector may be compressed according to the single correction image compression methods and systems of embodiments of the present invention.

Some embodiments of the present invention comprise methods and systems for using compressed display non-uniformity correction data. In some embodiments of the present invention, correction data for a display may be reconstructed from parameters stored on the display system. In some embodiments of the present invention, a plurality of correction images may be reconstructed from encoded eigen-images stored on the display system.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention, but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Inspection and testing of flat panel displays using a human operator may be costly, time consuming and based on the operator's perception. Therefore, the quality of human-operator-based inspections may be dependent on the individual operator and may yield subjective results that may be prone to error. Some automated inspection techniques may rely on a pixel-by-pixel measurement and correction of display non-uniformity. These techniques may require a prohibitive amount of memory for storage of the correction data, and methods and systems for reducing the storage requirements for the correction data may be desirable.

Mura defects are contrast-type defects where one, or more, pixels on a display is brighter, or darker, than the surrounding pixels when the display is driven at a constant gray level and should display uniform luminance. For example, when an intended flat region of color is displayed, various imperfections in the display components may result in undesirable modulations of the luminance. Mura defects may also be referred to as "Alluk" defects or, generally, non-uniformity distortions. Generically, such contrast-type defects may be identified as "blobs," "bands," "streaks," and other terms indicative of non-uniformity. There are many stages in the manufacturing process that may result in mura defects on the display.

Mura correction on a display may require pixel-by-pixel correction using stored correction data for the display. In some embodiments of the present invention, stored correction data may comprise data associated with a correction image, which may be denoted $I_{c,l}(i,j)$, associated with a color component and a gray level. Some of these embodiments may comprise three color components, which may be denoted c, $0 \leq c \leq 2$. Some of these embodiments may comprise 256 gray levels, which may be denoted l, $0 \leq l \leq 255$.

Figure 1:
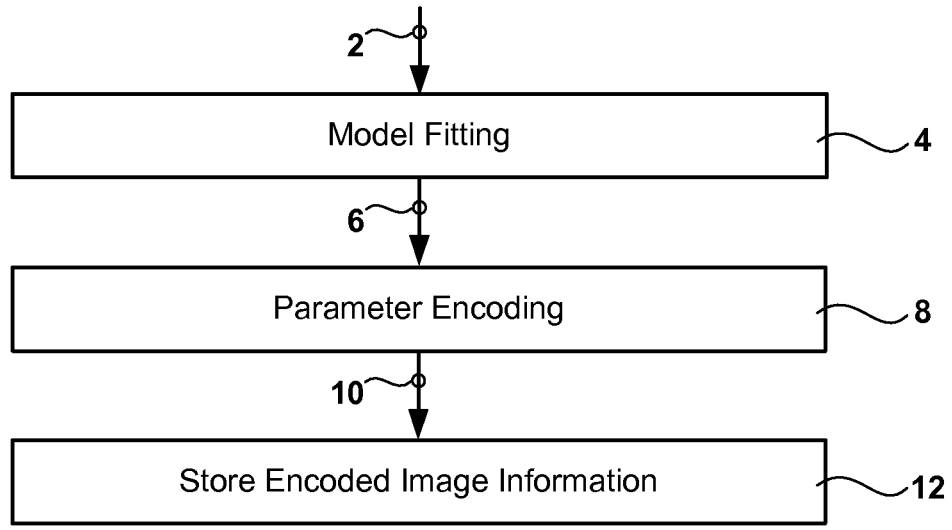
FIG. 1 is a chart showing exemplary embodiments of the present invention comprising fitting a model to a correction image and encoding the values of the model parameters for storage at a display system.

Some embodiments of the present invention may be described in relation to FIG. 1. In these embodiments, model parameter values 6 may be determined by fitting 4 a model to an input correction image 2. The model parameter values 6 may be encoded 8, and the encoded model parameter values 10, also considered encoded image information, may be stored 12. Model parameter values 6 may be encoded 8 using predictive coding methods known in the art. One exemplary coding method is the method disclosed in U.S. patent application Ser. No. 11/946,298, entitled "Two-Dimensional DPCM with PCM Escape Mode," filed on Nov. 28, 2007, which is hereby incorporated herein by reference in its entirety.

Figure 2:
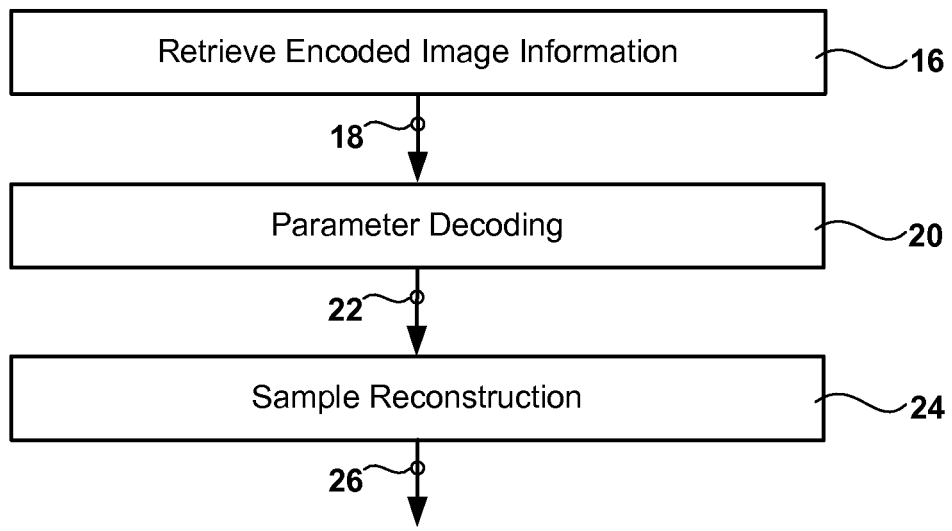
FIG. 2 is a chart showing exemplary embodiments of the present invention comprising decoding encoded model parameter values stored at a display system and reconstructing a correction image using the decoded model parameter values.

Some embodiments of the present invention may be described in relation to FIG. 2. In these embodiments, encoded image information 18 may be retrieved 16 from storage, and the encoded image information 18 may be decoded 20, thereby generating decoded model parameter values 22. The decoded model parameter values 22 may be used to reconstruct 24 samples of the correction image 26.

Figure 3:
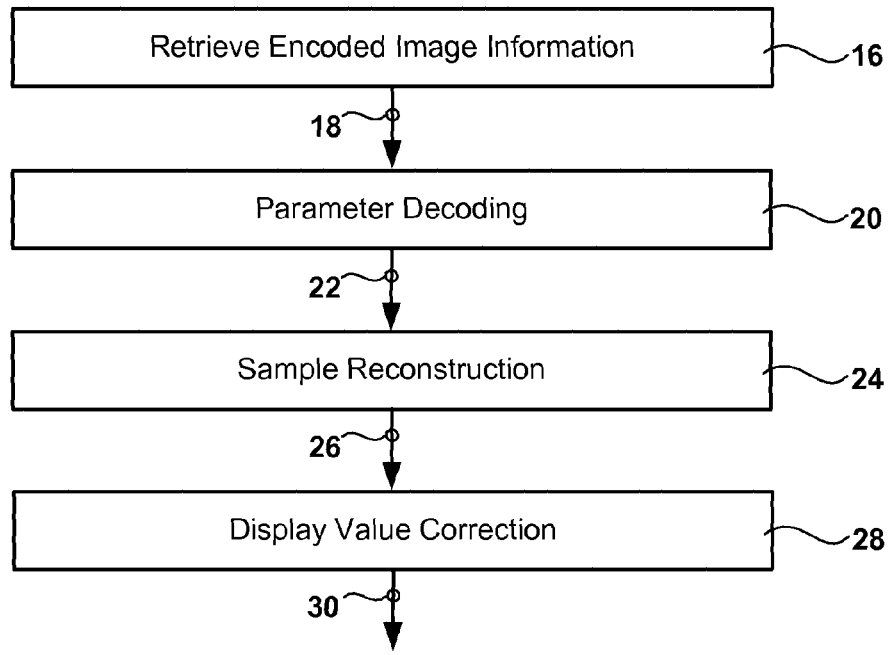
FIG. 3 is a chart showing exemplary embodiments of the present invention comprising using a reconstructed correction image to correct a display value.

In some embodiments of the present invention described in relation to FIG. 3, the samples of the correction image 26 may be used to correct 28 a display value thereby generating a mura-corrected display value 30.

Some embodiments of the present invention may comprise a piecewise polynomial model. In these embodiments, the input correction image 2 may be partitioned into one, or more, two-dimensional (2D) regions, also considered a patch. In some embodiments of the present invention, the partition grid may be spatially uniform. In alternative embodiments, the partition grid may be adaptive. In some embodiments of the present invention, the denseness of the partition grid may be related to the variation in the correction image. In some of these embodiments, the partition grid may be denser in areas of the correction image in which there is greater variation. In some embodiments of the present invention, information defining the partition grid may be stored with the encoded model parameters.

In embodiments of the present invention comprising a piecewise polynomial model, a region, which may be denoted $P_p(i,j)$, of the input correction image 2 may be approximated by a planar model according to:

$$\tilde{P}_p(i,j) = a_p i + b_p j + k_p,$$

where $a_p$, $b_p$ and $k_p$ denote the model parameters associated with the image region $P_p(i,j)$ and $\tilde{P}_p(i,j)$ denotes the approximated region. The model fitting 4 may minimize a measure of the discrepancy between the image region $P_p(i,j)$ and the approximated region $\tilde{P}_p(i,j)$. In some embodiments of the present invention, the image region may be a rectangular patch. In alternative embodiments of the present invention, the shape of the region may be non-rectangular.

The parameters $a_p$, $b_p$ and $k_p$ for all regions in a partition may be encoded 8 and stored 12. A reconstructed correction image 26 may be reconstructed by decoding 20 the parameters 18 for each region and calculating 24 the approximated region.

Alternative embodiments of the present invention may comprise a model selecting between two planar fittings: $\tilde{P}_{1,p}(i,j) = a_p i + k_{1,p}$ and $\tilde{P}_{2,p}(i,j) = b_p j + k_{2,p}$. In these embodiments, a binary mode indicator, which may be denoted $d_p$, may indicate which of the two fittings is selected for a given region.

The parameter $d_p$ and the associated model parameters $(a_p, k_{1,p})$ or $(b_p, k_{2,p})$ for all regions in a partition may be encoded 8 and stored 12. A reconstructed correction image 26 may be reconstructed by decoding 20 the parameters 18 for each region and calculating 24 the approximated region using the appropriate model indicated by the binary mode indicator.

In some embodiments of the present invention, the mode decision for a region in the model fitting 4 may be made based on which planar fitting generates the best fit to the input region of the correction image.

Alternative embodiments of the present invention may comprise fitting a two-dimensional B-spline surface to the input correction image 2. In some of these embodiments, the location of the knot points may be equidistant, also considered uniform, spatially. In alternative embodiments, the location of the knot points may be adaptive, also considered non-uniform, spatially. In some embodiments of the present invention, the density of knot points may be related to the variation in the correction image. In some of these embodiments, the knot points may be denser in areas of the correction image in which there is greater variation. In some embodiments of the present invention, information defining the location of the knot points may be stored with the encoded knot values.

In some embodiments of the present invention, the basis B-splines for degree n may be shifted copies of each other. In these embodiments, given knot values, which may be denoted g(v,h), an approximated correction image, which may be denoted $\tilde{I}_{c,l}(i,j)$, may be determined by up-sampling the knot samples and then convolving with a B-spline kernel, which may be denoted $b^n(i,j)$. The approximated correction image may be determined according to:

$$\tilde{I}_{c,l}(i,j) = [g]_{\uparrow mv,mh} * b_{mv,mh}^n,$$

where mv and mh are sub-sampling ratios in the vertical and horizontal spatial dimensions, respectively.

Some embodiments of the present invention may comprise a uniform B-spline of degree 1. These embodiments may be equivalent to bilinear sub-sampling where the knot values may be sub-sampled pixel intensity values.

In some embodiments of the present invention comprising fitting 4 a B-spline surface to the input correction image 2, the model fitting 4 may comprise determining knot values that minimize an error measure between the input correction image 2 $I_{c,l}(i,j)$ and the correction image reconstructed using the model $\tilde{I}_{c,l}(i,j)$. Exemplary error measures include mean-square error (MSE), mean absolute error (MAE), root mean-square error (MSE) and other error measures known in the art. In some embodiments of the present invention comprising the MSE, the spline approximation may be solved by recursive filtering. In alternative embodiments, the spline approximation may be solved by systems of linear equations.

In some embodiments of the present invention, predictive coding may used to encode 8 the model parameters representative of the correction image 2.

Figure 4:
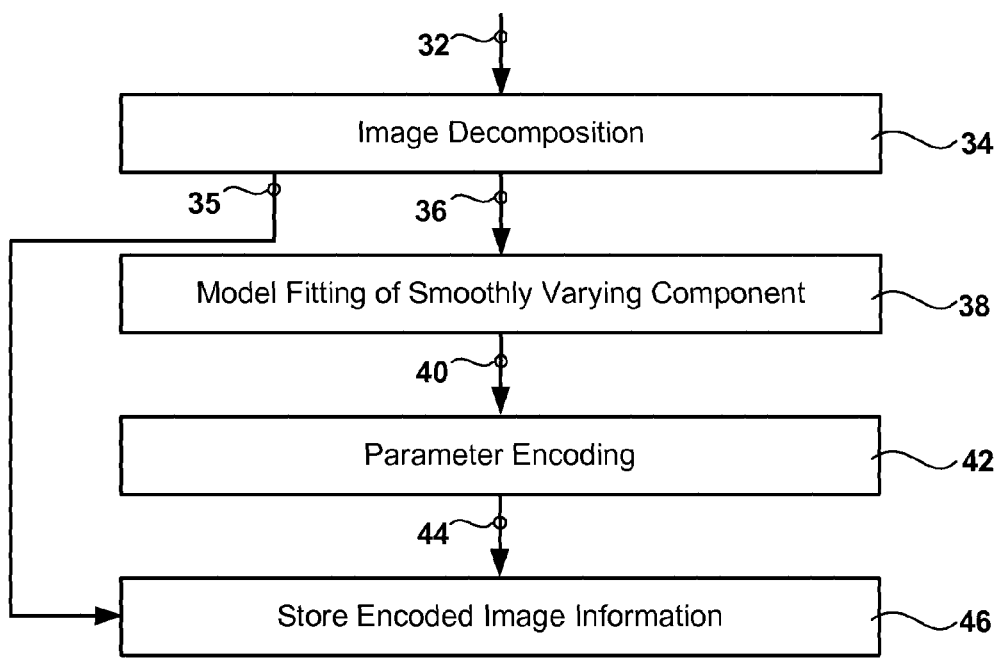
FIG. 4 is a chart showing exemplary embodiments of the present invention comprising decomposing a correction image into a structure image comprising horizontal and vertical structure and a smoothly varying image for which model parameter values may be determined, encoded and stored in addition to information describing the structure image.

In some embodiments of the present invention described in relation to FIG. 4, a correction image 32 may be decomposed 34 separating the vertically and horizontally aligned structures 35 of the correction image 32 from a smoothly varying component 36. A model according to any of the above-described embodiments may be fit 38 to the smoothly varying component 36. The model parameter values 40 may be encoded 42, and the encoded model parameter values 44 and the vertically and horizontally aligned structures 35 of the correction image 32 may be stored. The correction image 32, $I_{c,l}(i,j)$, may be decomposed according to:

$$I_{c,l}(i,j)=S_{c,l}(i,j)+N_{c,l}(i,j),$$

where $S_{c,l}(i,j)$ denotes the vertically and horizontally aligned structures 35 and $N_{c,l}(i,j)$ denotes the smoothly varying component 36. In some embodiments, the vertically and horizontally aligned structures 35 may be represented by a column vector and a row vector, which may be denoted $Col_{1\times W}$ and $Row_{H\times 1}$, respectively, where W and H refer to the width and height of the correction image 32, respectively. In some of these embodiments, the vertically and horizontally aligned structures $S_{c,l}(i,j)$ may be determined according to:

$$S_{c,l}(i,j)=Col_{H\times 1}*Row_{1\times W}.$$

In alternative embodiments, the vertically and horizontally aligned structures 35 $S_{c,l}(i,j)$ may be determined according to:

$$S_{c,l}(i,j)=Col_{H\times 1}*1_{1\times W}+1_{H\times 1}*Row_{1\times W},$$

where $1_{1\times W}$ and $1_{H\times 1}$ denote a row vector and a column vector of all "1" entries, respectively.

In some embodiments of the present invention, the column vector $Col_{1\times W}$ and the row vector $Row_{H\times 1}$ may be stored 46 directly as part of the encoded image information. In alternative embodiments, the column vector $Col_{1\times W}$ and the row vector $Row_{H\times 1}$ may be encoded prior to storage.

The above-described embodiments of the present invention relate to one correction image. In some embodiments of the present invention, multiple correction images may be encoded for storage or other use.

Figure 5:
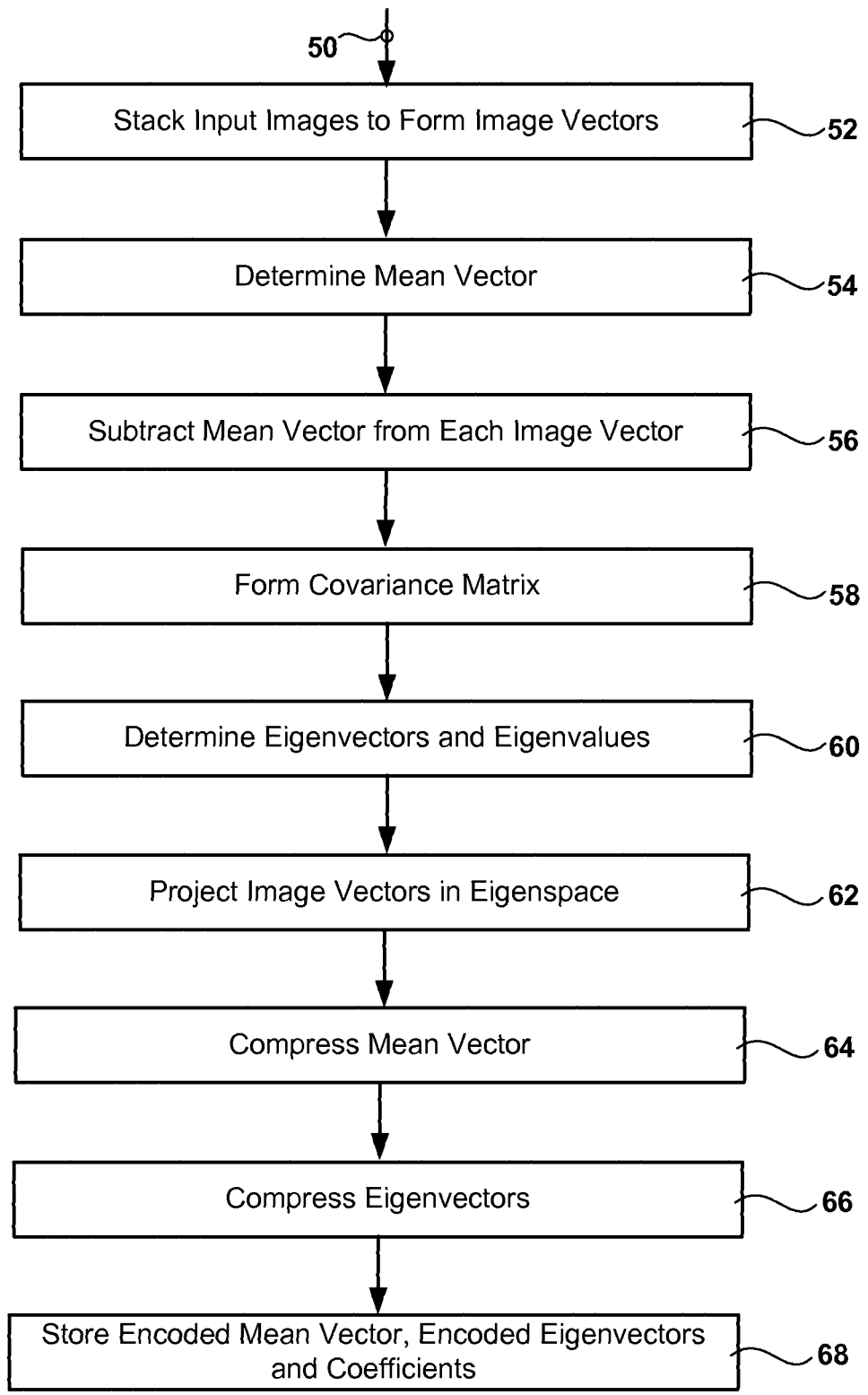
FIG. 5 is a chart showing exemplary embodiments of the present invention comprising encoding a plurality of correction images by projecting the correction images into an associated eigenspace.

Some embodiments of the present invention may be described in relation to FIG. 5. In these embodiments, mura-correction images may be captured for K different gray levels, and each with C color components. The display code value range may be denoted l, $0 \leq l \leq L-1$, and the color components may be denoted c, $0 \leq c \leq C$. In an exemplary embodiment, there may be 256 gray levels and 3 color components. In this exemplary embodiment, $0 \leq l \leq 255$ and c, $0 \leq c \leq 2$. The mura-correction images may be denoted $I_{c,l_k}(i,j)$ where $0 \leq k \leq K-1$ and $l_k$ denotes the gray level corresponding to the mura-correction image. Thus, there may be 3K mura-correction images $I_{c,l_k}(i,j)$ which may be denoted $I_p(i,j)$, $0 \leq p \leq 3K-1$. Each of the mura-correction images 50 may be stacked 52 into a vector of length W×H, where W and H denote the width and height, respectively, of a mura-correction image $I_p(i,j)$, $0 \leq p \leq 3K-1$. Exemplary stacking 52 methods comprise stacking 52 by row, stacking 52 by column and other stacking 52 methods wherein a 2D image is reformatted into a 1D vector format. A vector corresponding to a mura-correction image $I_p(i,j)$ may be denoted $\Gamma_p$ and may be referred to as a correction-image vector. The mean correction-image vector, which may be denoted $\Psi$, of the $\Gamma_p$ may be determined 54 according to:

$$\Psi = \frac{1}{3K}\sum_{p=0}^{3K-1}\Gamma_p.$$

A mean-adjusted correction-image vector, which may be denoted $\Phi_p$, corresponding to each correction-image vector, $\Gamma_p$, may be determined by subtracting 56 the mean correction-image vector, $\Psi$, from each correction-image vector, $\Gamma_p$, according to:

$$\Phi_p = \Gamma_p - \Psi.$$

The covariance matrix, which may be denoted Cov, may be formed 58 according to:

$$Cov = \frac{1}{3K}\sum_{p=0}^{3K-1}\Phi_p\Phi_p^T.$$

Principle Component Analysis (PCA) may be applied by determining 60 the eigenvalues and eigenvectors of the covariance matrix, Cov. An eigenvector and its associated eigenvalue may be denoted $u_q$ and $\lambda_q$, respectively, where $0 \leq q \leq m-1$. Each input correction-image vector, $\Gamma_p$, may be projected 62 to the eigenspace corresponding to the eigenvectors and eigenvalues according to:

$$\omega_p(q) = u_q^T \cdot \Phi_p, 0 \leq q \leq m-1.$$

The mean correction-image vector, $\Psi$, and the eigenvectors, $u_q$, may be compressed 64, 66 according to any of the methods and systems described herein for compressing single image correction images by un-stacking the vectors back to image form. The un-stacked eigenvectors in image form may be referred to as eigen-images, and the un-stacked mean correction-image vector may be referred to as the mean correction-image. The encoded mean correction-image, eigen-images and projection coefficients, $\omega_p(q)$, $0 \leq q \leq m-1$, $0 \leq p \leq 3K-1$ may be stored 68. In some embodiments of the present invention, the projection coefficients may be stored 68 directly. In alternative embodiments of the present invention, the projection coefficients may be encoded and stored.

Figure 6:
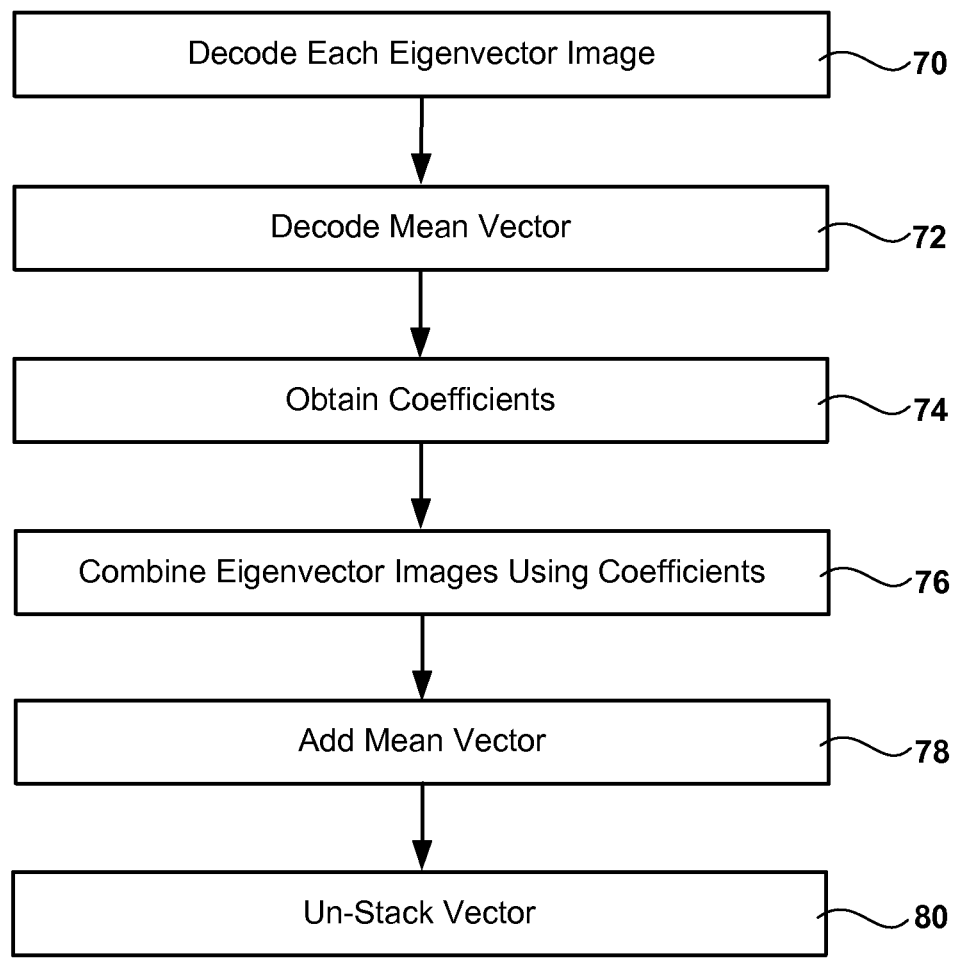
FIG. 6 is a chart showing exemplary embodiments of the present invention comprising determining a correction image using stored eigenvectors and projection coefficients.

In some embodiments of the present invention described in relation to FIG. 6, a correction image may be reconstructed for use in correcting a display value. In these embodiments, the stored data may be decoded. Each eigenvector, $u_q$, $0 \leq q \leq m-1$, may be decoded 70 from the stored data by decoding the eigen-images and stacking them to form the eigenvectors. The mean correction-image vector, $\Psi$, may similarly be decoded 72 from the stored data, and the projection coefficients may be obtained 74 from the stored data. The decoded eigenvectors may be denoted $\tilde{u}_q$, $0 \leq q \leq m-$ 1, and the decoded mean vector may be denoted $\hat{\Psi}$. A reconstructed correction image, which may be denoted $\tilde{I}_p$, may be determined according to:

$$\tilde{I}_p = \text{unstack}\left[\sum_{q=0}^{m} \omega_p(q)\tilde{u}_q + \hat{\Psi}\right]$$

for gray levels and color components corresponding to captured mura-correction images. In some embodiments of the present invention, missing gray level correction images may be determined by linear interpolation using the closest two neighboring levels. In some embodiments of the present invention, the interpolation may be applied on the projected coordinates in the eigenspace.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for storing corrective image data, said method comprising:
   receiving a plurality of correction images associated with a first display system, wherein each correction image in said plurality of correction images is associated with an image captured at a different gray level;
   generating a plurality of eigenvectors associated with said plurality of correction images;
   projecting each of said correction images onto the eigenspace defined by said plurality of eigenvectors, thereby producing a plurality of coefficients associated with each correction image in said plurality of correction images;
   encoding said plurality of eigenvectors, thereby producing encoded data; and
   storing, in a storage location at said first display system, said encoded data and said plurality of coefficients associated with each correction image in said plurality of correction images.

2. The method as described in claim 1, wherein said plurality of correction images comprises:
   a first plurality of correction images associated with a first color component; and
   a second plurality of correction images associated with a second color component.

3. The method as described in claim 1 further comprising using said encoded data and said plurality of coefficients associated with each correction image in said plurality of correction images to correct a display value at said first display system.

4. The method as described in claim 1, wherein said generating a plurality of eigenvectors associated with said plurality of correction images comprises:
   forming a plurality of correction-image vectors, wherein each correction-image vector in said plurality of correction-image vectors is associated with a correction image in said plurality of correction images;
   determining a mean correction-image vector of said plurality of correction-image vectors;
   subtracting said mean correction-image vector from each correction-image vector in said plurality of correction-image vectors, thereby producing a plurality of mean-adjusted correction-image vectors;
   forming the covariance matrix associated with said plurality of mean-adjusted correction-image vectors; and
   determining the eigenvectors of said covariance matrix.

5. The method as described in claim 4 further comprising:
   encoding said mean correction-image vector, thereby producing an encoded mean correction-image vector; and
   storing said encoded mean correction-image vector with said encoded data.

6. The method as described in claim 5, wherein said encoding said mean correction-image vector comprises:
   forming a mean image from said mean correction-image vector; and
   fitting a first model to said mean image, thereby producing at least one model parameter value associated with said mean image.

7. The method as described in claim 6, wherein said fitting a first model to said mean image comprises:
   wherein said mean image is decomposed into a structural part and a smoothly varying part, wherein:
      said structural part specifies vertically and horizontally aligned structures from said mean image; and
      said smoothly varying part specifies a smoothly varying component of said mean image;
   fitting said first model to said smoothly varying part; and
   storing a representation of said structural part with said encoded data.

8. The method as described in claim 6, wherein said fitting a first model to said mean image comprises:
   partitioning said mean image into at least one image patch; and
   determining planar model parameter values associated with each of said at least one image patches, wherein said at least one model parameter value comprises said planar model parameter values associated with each of said at least one image patches.

9. The method as described in claim 6 further comprising:
   fitting a second model to said mean image;
   selecting said first model or said second model, thereby producing a model selection; and
   storing said model selection with said encoded data.

10. The method as described in claim 9, wherein:
    said first model is one of a horizontal planar model and a vertical planar model; and
    said second model is the other of said horizontal planar model and said vertical planar model.

11. The method as described in claim 9, wherein said selecting comprises:
    selecting said first model when said first model provides a better approximation to said mean image than said second model; and
    selecting said second model when said second model provides a better approximation to said mean image than said first model.

12. The method as described in claim 6, wherein:
    said first model comprises a B-spline; and
    said fitting a first model to said mean image comprises determining a plurality of knot points for said B-spline.

13. The method as described in claim 1, wherein said encoding said plurality of eigenvectors comprises:
    forming a first eigen-image associated with a first eigenvector in said plurality of eigenvectors; and
    fitting a first model to said first eigen-image, thereby producing at least one model parameter value associated with said first eigen-image.

14. The method as described in claim 13, wherein said fitting a first model to said first eigen-image comprises:
   partitioning said first eigen-image into at least one image patch; and
   determining planar model parameter values associated with each of said at least one image patches, wherein said at least one model parameter value comprises said planar model parameter values associated with each of said at least one image patches.

15. The method as described in claim 13 further comprising:
   fitting a second model to said first eigen-image;
   selecting said first model or said second model, thereby producing a model selection; and
   storing said model selection with said encoded data.

16. The method as described in claim 15, wherein:
   said first model is one of a horizontal planar model and a vertical planar model; and
   said second model is the other of said horizontal planar model and said vertical planar model.

17. The method as described in claim 15, wherein said selecting comprises:
   selecting said first model when said first model provides a better approximation to said first eigen-image than said second model; and
   selecting said second model when said second model provides a better approximation to said first eigen-image than said first model.

18. The method as described in claim 13, wherein:
   said first model comprises a B-spline; and
   said fitting a first model to said first eigen-image comprises determining a plurality of knot points for said B-spline.

19. The method as described in claim 13, wherein said fitting a first model to said first eigen-image comprises:
   wherein said first eigen-image is decomposed into a structural part and a smoothly varying part, wherein said structural part specifies vertically and horizontally aligned structures from said first eigen-image and said smoothly varying part specifies a smoothly varying component of said first eigen-image;
   fitting said first model to said smoothly varying part; and
   storing a representation of said structural part with said encoded data.

20. A method for correcting a display value, said method comprising:
   retrieving encoded correction-image information associated with a display system, wherein said encoded correction-image information corresponds to a plurality of correction images, wherein each correction image in said plurality of correction images is associated with an image captured at a different gray level;
   decoding a plurality of eigenvectors from said encoded correction-image information;
   decoding a mean vector from said encoded correction-image information;
   decoding a plurality of projection coefficients from said encoded correction-image information;
   combining said plurality of eigenvectors, said mean vector and said plurality of projection coefficients to determine a correction value; and
   adjusting a display value according to correction value.

21. The method as described in claim 20, wherein said encoded correction-image information is stored at said display system.

22. The method as described in claim 20, wherein said decoding a plurality of eigenvectors from said encoded correction-image information comprises:
   decoding a first eigenvector from said plurality of eigenvectors, wherein said decoding a first eigenvector from said plurality of eigenvectors comprises:
      decoding at least one model parameter associated with said first eigenvector; and
      determining said first eigenvector using said at least one model parameter associated with said first eigenvector.

23. The method as described in claim 22, wherein said at least one model parameter value is a knot point associated with a B-spline.

24. The method as described in claim 22, wherein said at least one model parameter value is a planar model parameter associated with a first patch of a first eigen-image associated with said first eigenvector.

25. The method as described in claim 22, wherein said decoding a first eigenvector from said plurality of eigenvectors comprises:
   retrieving a first model selector, wherein said first model selector is associated with a first patch of said first eigenvector;
   determining, from said at least one model parameter value associated with said first eigenvector, at least one patch parameter value associated with said first patch;
   selecting a first model based on said model selector; and
   determining said first eigenvector using said at least one model parameter associated with said first eigenvector, said first model and said at least one patch parameter value.

26. The method as described in claim 20, wherein said decoding a mean vector from said encoded correction-image information comprises:
   decoding at least one model parameter associated with said mean vector; and
   determining said mean vector using said at least one model parameter associated with said mean vector.

27. The method as described in claim 26, wherein said at least one model parameter value is a knot point associated with a B-spline.

28. The method as described in claim 26, wherein said at least one model parameter value is planar model parameter associated with a first patch of a mean image associated with said mean vector.

29. The method as described in claim 20, wherein said decoding a mean vector from said encoded correction-image information comprises:
   retrieving a first model selector associated with said mean vector, wherein said first model selector is associated with a first patch of said mean vector;
   decoding at least one model parameter associated with said mean vector;
   determining, from said at least one model parameter value associated with said mean vector, at least one patch parameter value associated with said first patch;
   selecting a first model based on said model selector; and
   determining said mean vector using said at least one model parameter associated with said mean vector, said first model associated with said mean vector and said at least one patch parameter value associated with said mean vector.

30. The method as described in claim 20, wherein said combining said plurality of eigenvectors, said mean vector and said plurality of project coefficients to determine a correction value comprises:

determining a first color component;

determining a first code value;

determining a first plurality of projection coefficients from said plurality of projection coefficients, wherein said first plurality of project coefficients is associated with said first color component and said first code value;

multiplying each eigenvector in said plurality of eigenvectors by an associated projection coefficient from said first plurality of projection coefficients, thereby producing a plurality of scaled eigenvectors; and summing said plurality of scaled eigenvectors and said mean vector.

31. The method as described in claim 20, wherein said decoding a plurality of eigenvectors from said encoded correction-image information comprises:

retrieving a representation of a first image, wherein said first image comprises horizontally and vertically aligned image structure associated with a first eigenvector in said plurality of eigenvectors;

determining a reconstruction of said first image using said representation;

decoding, for said first eigenvector, at least one model parameter associated with said first eigenvector; and determining said first eigenvector using said at least one model parameter associated with said first eigenvector and said reconstruction of said first image.

32. The method as described in claim 20, wherein said decoding a mean vector comprises:

retrieving a representation of a first image, wherein said first image comprises horizontally and vertically aligned image structure associated with said mean vector;

determining a reconstruction of said first image using said representation;

decoding, for said mean vector, at least one model parameter associated with said mean vector; and determining said mean vector using said at least one model parameter associated with said mean vector and said reconstruction of said first image.

* * * * *